United States Patent [19]
Bodeep et al.

[11] Patent Number: 5,864,672
[45] Date of Patent: Jan. 26, 1999

[54] SYSTEM FOR CONVERTER FOR PROVIDING DOWNSTREAM SECOND FDM SIGNALS OVER ACCESS PATH AND UPSTREAM FDM SIGNALS SENT TO CENTRAL OFFICE OVER THE SECOND PATH

[75] Inventors: George E. Bodeep, Lawrenceville, Ga.; Thomas Edward Darcie; Alan H. Gnauck, both of Middletown, N.J.; Xiaolin Lu, Matawan, N.J.; Sheryl Leigh Woodward, Holmdel, N.J.

[73] Assignee: AT&T Corp., Middletown, N.J.

[21] Appl. No.: 916,023

[22] Filed: Aug. 21, 1997

Related U.S. Application Data

[63] Continuation of Ser. No. 526,736, Sep. 12, 1995, abandoned.
[51] Int. Cl.[6] ...................................................... G06F 15/16
[52] U.S. Cl. ........................... 395/200.48; 348/13; 348/6
[58] Field of Search ...................... 348/13, 6; 395/200.48

[56] References Cited

U.S. PATENT DOCUMENTS

| | | | |
|---|---|---|---|
| 4,205,326 | 5/1980 | Porter et al. | 375/212 |
| 4,460,994 | 7/1984 | Scanlon et al. | 370/452 |
| 4,646,295 | 2/1987 | Basile | 370/487 |
| 4,757,497 | 7/1988 | Beierle et al. | 370/405 |
| 5,189,673 | 2/1993 | Burton et al. | 370/485 |
| 5,235,619 | 8/1993 | Beyers, II et al. | 375/260 |
| 5,263,021 | 11/1993 | Ortel | 370/486 |
| 5,408,259 | 4/1995 | Warwick | 348/6 |
| 5,499,047 | 3/1996 | Terry et al. | 348/6 |
| 5,499,241 | 3/1996 | Thompson et al. | 370/486 |
| 5,528,582 | 6/1996 | Bodeep et al. | 370/24 |
| 5,550,579 | 8/1996 | Martinez | 348/12 |
| 5,553,064 | 9/1996 | Paff et al. | 370/486 |
| 5,608,446 | 3/1997 | Carr et al. | 348/6 |
| 5,613,191 | 3/1997 | Hylton et al. | 455/3.1 |
| 5,642,155 | 6/1997 | Cheng | 348/12 |

OTHER PUBLICATIONS

Jack B. Terry, "Alternative Approaches to Digital Transmission Architecture for Switched Cable TV Distribution," SCTE '94, Jan. 4–6, 1994, pp. 77–86. Cited in application; technological background of the invention.

Gary Kim, "Interactive Services: Committed to HFC—And the Future," America's Network, Aug. 1995, pp. 20, 22. Technological background of the invention.

James A. Chiddix, Walter S.ciciora (IEEE Dec. 2, 1988) introduction of optical fiber transmission technology into existing cable television network.

*Primary Examiner*—Thomas C. Lee
*Assistant Examiner*—Anderson I. Chen

[57] ABSTRACT

A converter apparatus (Mini Fiber Node MFN) for use in a communication network (e.g., a coax network) includes a signal distribution unit (e.g., fiber node FN) for transmitting frequency-division multiplexed communication signals downstream over a coax cable to a node apparatus (amplifier) and via an access path to a plurality of end unit apparatuses connected thereto. The converter apparatus connects to the access path and receives downstream second FDM signals directly from the central office over an optical communication path and sends the second FDM signals to at least one end unit apparatus over the access path. The converter apparatus also receives upstream FDM signals from the at least one end unit apparatus over the access path and transmits the upstream FDM signals to the central office over the optical path. In another embodiment, the converter apparatus connects directly to the primary path to provide service to an end user apparatus connected in a "tapped-bus" arrangement.

24 Claims, 6 Drawing Sheets

SYSTEM FOR CONVERTER FOR PROVIDING DOWNSTREAM SECOND FDM SIGNALS OVER ACCESS PATH AND UPSTREAM FDM SIGNALS SENT TO CENTRAL OFFICE OVER THE SECOND PATH

This application is a continuation of application Ser. No. 08/526,736, filed on Sep. 12, 1995, now abandoned.

CROSS-REFERENCE TO RELATED APPLICATION

Related subject matter is disclosed in the following co-pending application assigned to the same Assignee hereof: U.S. patent application Ser. No. 08/282,247, entitled "Network Apparatus And Method For Providing Two-Way Broadband Communications", now U.S. Pat. No. 5,528,582.

TECHNICAL FIELD

This invention relates to broadband communications and, more particularly, to providing two-way broadband communications by adding a separate communication path to the existing one-way or extremely asymmetric two-way broadband network.

BACKGROUND OF THE INVENTION

Fiber/coax networks (FCNs) or hybrid fiber/coax (HFC) networks (hereinafter called HFCs) that combine the low cost and large bandwidth of coaxial cable with the flexibility of lightwave feeder technology have been shown to be a very promising system architecture for current and near-future broadband local access applications. Optical fiber is used to span large distances from the central office (CO) to the remote fiber node (FN) where the coaxial cable distributes information to the end units. HFCs offer an immediate low-cost path to any presently defined broadband or narrowband, broadcast or switched, analog or digital services and can be upgraded to provide increased bandwidth with interactive multimedia services or other future services. For cable TV companies, the advantages of this architecture have already been demonstrated where the migration from pure coax to fiber/coax networks has resulted in improved signal quality, higher reliability and greatly increased bandwidth (approaching 1 GHz) to the homes. For local exchange carriers (LECs), HFCs provide sufficient bandwidth for video services for less cost than alternative subscriber loop systems. With its low cost, large bandwidth, and high penetration (95% of U.S. homes have been passed by existing cable TV coax networks), HFCs are presently the most popular broadband access infrastructure for current and near-future information services.

To realize the full potential of HFCs, more technical innovation is required. One of the most important challenges is to cost-effectively provide broadband two-way services over a system that has been designed primarily for distributed broadcast television services. Current HFCs support limited two-way services by defining the upstream traffic in the traditional upstream frequency band of 5–40 MHz as shown by band Upstream 1 in FIG. 1. However, this small upstream bandwidth limits services that can be provided. Further, due to heavy in- air radio transmission (i.e., amateur radio) in that frequency range, ingress noise in the coaxial cable can seriously degrade channel performance.

To overcome this ingress noise and create more upstream bandwidth, one approach is to use a high-frequency split plan, where the upstream traffic is located in one band at frequencies greater than the downstream band, as shown by Upstream 2 in FIG. 1. This approach does not affect existing downstream services and has low ingress noise in the broadband return path. Though the high frequency band is preferable to the low frequency band (Upstream 1), transmitting 1 GHz signals over large distances is difficult due to higher loss in the coax cable and the need for broadband high power amplifiers. Both this approach and the traditional approach have the limitation that the total bandwidth has to be pre-divided into downstream and upstream bands, with diplexers (or triplexers) and separate upstream amplifiers installed in all amplifiers to provide non-overlapping bi-directional paths. Downstream and upstream bandwidth allocations are then restricted to those defined during construction and cannot be changed without fully renovating the coax network. This fixed pre-provision frequency plan limits the network's capability to support wide varieties of future broadband two-way symmetric and asymmetric services. In addition, the current HFC bandwidth is limited by the bandwidth of the coax amplifier, which is typically 350, 550 or 750 MHz, while the passive coax may have a bandwidth approaching 1 GHz.

In order to solve the upstream limitations and to achieve flexible bandwidth allocation, the previously referenced patent application has proposed using a coax/fiber ring architecture, depicted in FIG. 2. In this system, upstream traffic is transmitted downstream to the final amplifier. After this amplifier is a low-cost optical fiber communication path which sends these signals upstream to the head-end or central office. The total bandwidth of this system is limited by the amplifier's bandwidth (typically 750 MHz).

A prior art article (entitled "Alternative Approaches to Digital Transmission Architecture for Switched Cable TV Distribution" by J. B. Terry, *SCTE* '94, January 1994, pages 77–86) has proposed a method for utilizing the greater bandwidth of the coax (typically 1 GHz) by placing a digital communication link to each bridger amplifier. That article proposes placing QAM modems in the digital fiber terminating unit (DFTU). This allows the full bandwidth of the coax cable to be used; however, it places expensive, power-hungry radio frequency (RF) components in the field. Because the modems are located in the DFTU, they cannot be shared among as many users. It also is difficult to dynamically allocate bandwidth in this system as the DFTU would require additional processing power to enable dynamic allocation.

SUMMARY OF THE INVENTION

The present invention is the use of a converter apparatus (Mini Fiber Node MFN) in a communication network (e.g., a coax network), including a signal distribution unit (e.g., fiber node FN) for transmitting frequency-division multiplexed communication signals downstream over a coax cable to a node apparatus (amplifier) and via an access path to a plurality of end unit apparatuses connected thereto.

In one embodiment, the converter apparatus connects to the access path and may either receive downstream second FDM signals directly from the central office over an optical communication path and send the second FDM signals to at least one end unit apparatus over the access path or the converter apparatus may receive upstream FDM signals from the at least one end unit apparatus over the access path and transmit the upstream FDM signals to the central office over the optical path. When the second communication path is bidirectional, it may carry both of the above downstream second and upstream FDM signals.

In another embodiment, the converter apparatus connects directly to the primary path to provide service to an end unit apparatus connected in a "tapped-bus" arrangement. Unlike the prior art (Terry article) is the fact that inexpensive optical links can be used to transmit the RF signals to the central office. There, modems can be centralized, allowing sharing. This gives our invention cost and operational advantages.

DETAILED DESCRIPTION

Figure 1:
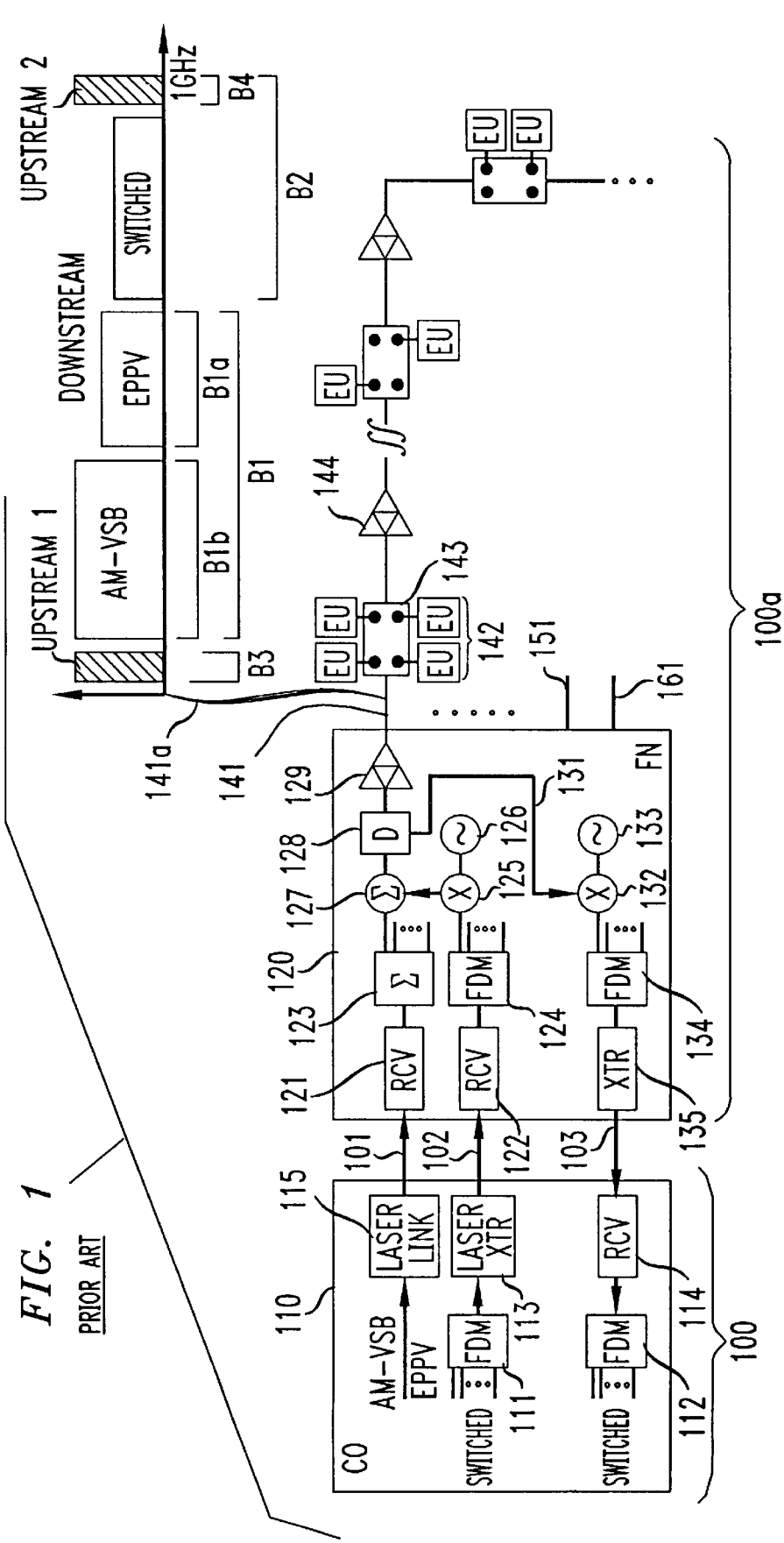
FIG. 1 shows a prior art proposed network for providing two-way broadband communications.

With reference to FIG. 1, an illustrative prior art hybrid fiber/coax (HFC) network proposal for a two-way broadband network is described. FIG. 1 shows a head-end or telephone switching network 100 which connects via optical fibers 101–103 to a coaxial cable distribution network 100a. The telephone switching network 100 includes central office (CO) 110 which couples switched signals (such as telephone, fax, data, etc.) via frequency-division multiplexing (FDM) unit 111 to transmitter laser 113 for transmission over optical fiber 102. Laser transmitter 113 may or may not be the same laser 115 as used for transmitting other broadcast information, such as multiple CATV channels (AM-VSB) or enhanced pay-per-view (EPPV) channels. Digital EPPV signals can be transmitted in groups using FDM and digital modem technology.

Optical signals received over optical fiber 103 are converted to an electrical signal by optical receiver unit 114 and demultiplexed by FDM unit 112 into narrowband channels that contain switched signals.

As shown, the broadcast and switched services signals are transmitted to signal distribution unit, referred to hereinafter as fiber node (FN), 120 over two separate optical fibers 101 and 102, respectively. At FN 120, the signals are received and converted to electrical signals by receivers 121, 122. As shown, FN 120 serves a plurality of coaxial cables 141, 151 and 161. Illustratively, only the combining of the broadcast and switched signals for downstream and upstream transmission over coaxial cable 141 is shown in FIG. 1. Using similar components, broadcast and switched signals from FDM 124 and to FDM 134 would be converted to handle, respectively, communications to and from coaxial cables 151 and 161 and to respective end units connected thereto.

The switched signal outputted from FDM 124 is frequency-shifted using mixer 125 and local oscillator 126 to a pre-assigned frequency and combined with the broadcast signal from splitter 123 in combiner 127 for transmission over coaxial cable 141. On coaxial cable 141, as shown by 141a, the CATV broadcast services use the AM-VSB band B1b and the EPPV channels use band B1a, for example, of the 55.25 MHz–500 MHz frequency band B1. The switched services use the frequency band B2, which, in this example, is greater than 500 MHz and less than 1 GHz. FDM 124 could be replaced with a splitter, and frequency-shifting components 125 and 126 could be eliminated if the same switched information were to be transmitted on each coaxial cable 141, 151 and 161.

In FN 120, diplexer 128 couples the signal from combiner 127 (to bidirectional amplifier 129) for transmission/reception over coaxial cable 141. The diplexer 128 enables the received signal 131 received over coaxial cable 141 to be separated from the transmitted signal being sent over coaxial cable 141. The received signal 131 is a narrowband upstream signal which occupies the frequency band B3 extending typically from 5–40 MHz. The received signal 131 is frequency-shifted by mixer 132 and local oscillator 133 and then frequency multiplexed by FDM 134 and converted to an optical signal by laser transmitter (XTR) 135 for transmission over optical fiber 103 to CO 110. The laser transmitter 135 also, like laser 113, uses a digital modulation format (i.e., 16 or 64 QAM, QPSK). FDM 134 and frequency-shifting apparatus 132 and 133 could be eliminated if all end units on coaxial cables 141, 151 and 161 were to share the same upstream bandwidth.

The coaxial cable 141, illustratively, distributes signals to and receives signals from a plurality of end unit apparatuses (also referred to hereinafter as end users) (e.g., 142) using a plurality of cable taps (e.g., 143). Bi-directional amplifiers (e.g., 144) maintain the desired signal levels on coaxial cable 141.

As previously noted, the 5–40 MHz upstream bandwidth B3 presents a bandwidth bottleneck to providing additional services to the end units that connect to coaxial cable 141. Additionally, ingress noise induces channel impairment in the 5–40 MHz band. While some of the downstream frequency band B2, 500 MHz 1 GHz, can be allocated to upstream communications, such an allocation would require modified diplexers (e.g., 128) that would have to be changed whenever a change in allocation is made.

In some HFC networks, the coax amplifier 144 can only handle downstream broadcasting, and the paths 128, 131, 132, 133, 134, 135, 103, 114 and 112 do not exist.

Figure 2:
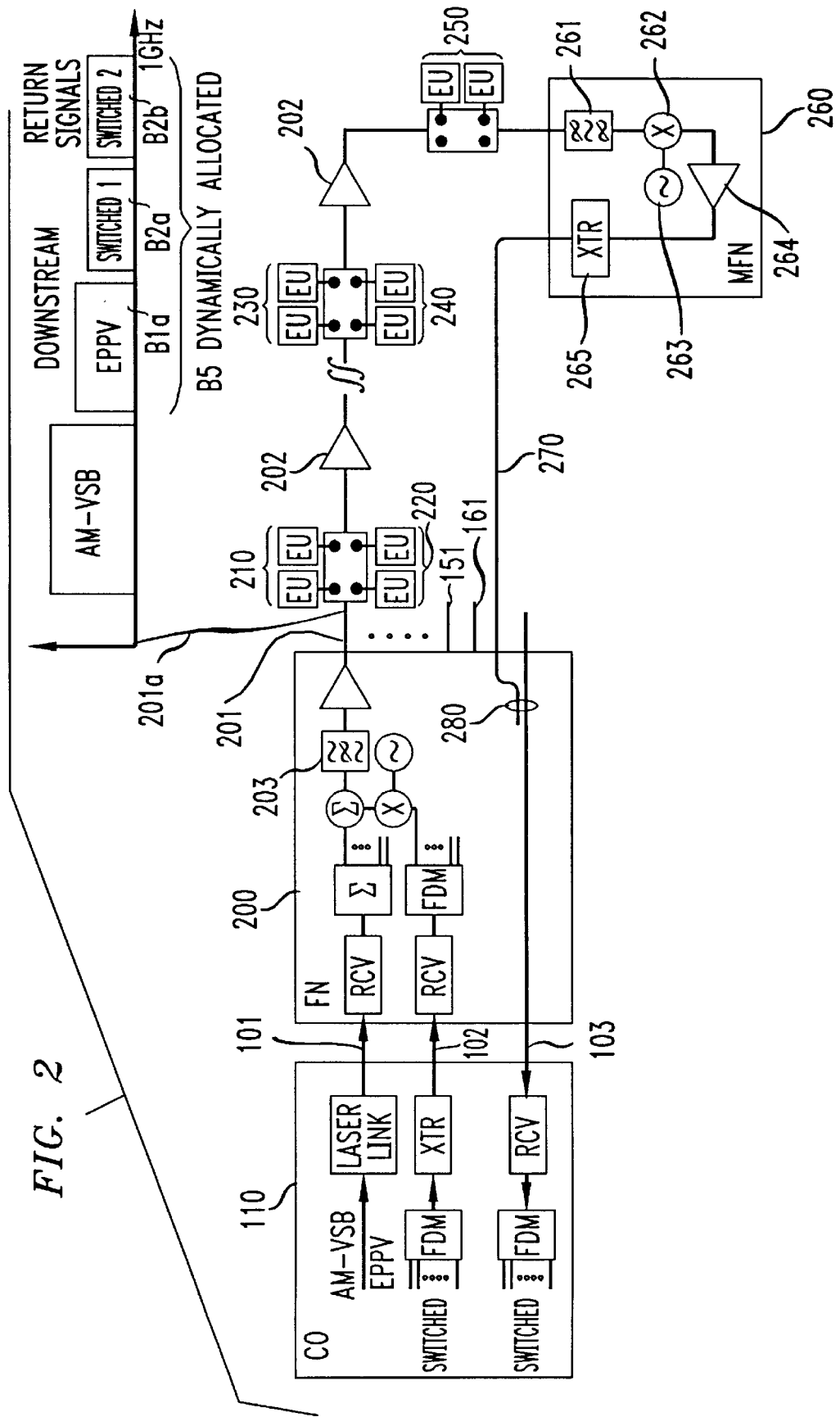
FIG. 2 shows an illustrative embodiment of a two-way broadband network in accordance with the previously referenced patent application.

A two-way broadcast communication network in accordance with the previously referenced patent application is illustrated in FIG. 2. In FIG. 2 all components that are numbered the same as components in FIG. 1 operate in the same manner (i.e., all those components that begin with the number 1). Since the components used in FIG. 2 are essentially the same as those well-known components used in the prior art system shown in FIG. 1, they will not be described further. The operation of such components are generally described, for example, in the book entitled *Cable Television*, by William O. Grant, published in 1988 by GWG Associates (New York).

In FIG. 2, downstream communications between FN 200 and end units 210–250 utilize the existing coaxial cable 201 broadcast network. The fiber node FN 200 generally utilizes the same components as FN 120 except that it does not have the receive signal 131 components 132–135. Rather than using bi-directional amplifiers, e.g., 144 of FIG. 1, to replace uni-directional amplifiers, e.g., 202 of FIG. 2, and adding diplexers, e.g., 128, to the network (as is done in the proposed prior art arrangement shown in FIG. 1), the previously referenced patent application instead provided a separate low-cost optical fiber communication path 270 to provide upstream communications.

The low-cost mini-fiber node (MFN) 260 is used to receive return signals transmitted by end units 210–250 and to convert them for communication upstream over optical fiber 270 to FN 200. The MFN 260 includes a bandpass filter 261, a frequency conversion module (including local oscillator 263 and mixer 262), an RF amplifier 264, and a low-cost optical transmitter (XTR) 265 (e.g., a laser transmitter) for transmitting upstream digital signals over optical fiber 270. Optical fiber 270 is installed, typically, in parallel to the coax cable 201 and connects MFN 260, via coupler 280, back to the return optical fiber 103 which connects FN 200 to CO 110. The MFN 260 is implemented using bandpass filter 261 in addition to receive signal 131 components 132, 133, 135 of FN 120 of FIG. 1, such as local oscillator 263, mixer 262 and transmitter 265. The MFN 260 is deployed in the furthest downstream location on cable 201. The mixer 262 and oscillator 263 are eliminated if the return signal is directly transmitted over fiber 270 without frequency conversion.

Because the upstream transmission from MFN 260 uses robust digital subcarrier signals, low-cost uncooled Fabry-Perot lasers (such as AT&T Astrotec lasers) could be deployed in the MFN 260 to reduce its cost. Since this invention uses a separate optical fiber 270 for upstream communications, it also eliminates the need for and the complexity of deploying diplexers and separate upstream amplifiers as was utilized in the traditional bi-directional cable network 100a shown in FIG. 1. However, it should be clear that this can also operate with the traditional bi-directional cable network 100a of FIG. 1. Therefore, the architecture provides a very practical way for permitting an existing uni-directional coaxial cable 201 network to be upgraded for broadband bi-directional services.

With the arrangement of FIG. 2, the downstream broadcast AM-VSB and EPPV signals and switched signal (shown in 201a) from FN 200 are delivered over coaxial cable 201 in the traditional way to end units (EUs) 210–250. When end units 210–250 transmit switched signal 2, that signal, hereinafter referred to as a "return signal," is also transmitted downstream in band B2b to MFN 260. Hence, even if cable 201 were bidirectional (like cable 141 of FIG. 1) the end units 210–250 could, but need not, transmit a portion of the return signal (signal 2) in the traditional 5–40 MHz band B3 (FIG. 1) or any fixed pre-defined upstream band on coaxial cable 201. The end units 201–250 can transmit information, i.e., the return signal, downstream in band B2b on coaxial cable 201. The band B2b can be defined to be any desired fraction of the total downstream bandwidth. Downstream transmission from end units 210–250 onto coax cable 201 is done easily if the taps connecting end units 210–250 allow power to be provided in both directions via coaxial cable 201. Drop taps that are not directional couplers allow this, and these are commonly used throughout the cable industry.

At MFN 260 the return signals from all of the end units 210–250 are collected, filtered to remove all or part of the downstream content, up- or down-converted or without any conversion and transmitted as upstream signals over a previously assigned frequency band on optical fiber 270. By utilizing cable network 201 only for downstream traffic and by allocating the downstream bandwidth B5 between the end unit return signals in band B2b and the FN 200 downstream signals in bands B1a and B2a, the cable network 201 is capable of supporting any presently defined and proposed broadband two-way symmetric and asymmetric services. As noted, the MFN 260 converts the return signals from the end units into upstream signals transmitted over optical fiber 270. Since the optical fiber 270 provides large upstream channel capacity and since the bandwidth over the coax can be partitioned with great flexibility, the resulting system is more suitable as the backbone for wireless and personal communication system (PCS) applications.

If needed, a notch filter 203 may be added to FN 200 to prevent downstream signal-induced distortion and impulse noise from falling into the return signal spectrum. If the return signals from the end units are assigned to a high-frequency band B2b that is typically above 30 MHz, the prior art problems with ingress-noise-induced channel impairment within the traditional 5–40 MHz upstream band are eliminated.

Based on the topology of the existing coax networks (i.e., 201), the fiber 270 from the MFN 260 could either loop back to coupler 280 in FN 200 or loop to the closest position along fiber 103 to which it can easily connect. This philosophy also applies to the location of MFN 260 which can be either at an individual node or combined with the nearest FN 200 location. This provides considerable flexibility for locating MFN 260. The shortening or even elimination of the extra fiber loops could also help to reduce the cost increment.

The upstream path 270 could also be one or more wire pairs, a coaxial cable or a radio (e.g., wireless) path. In such an arrangement, MFN 260 would include the well-known components to convert the upstream signal for transmission over the particular medium selected for the upstream path. An appropriate receiver circuit (not shown) at FN 200 would convert the received upstream signal to an optical signal which would then be coupled by coupler 280 to the optical fiber. Alternatively, the upstream path 270 could avoid FN 200 and terminate directly at CO 110. Additionally, the upstream communication can use any of the well-known forms of analog or digital communication available for the particular medium selected for the upstream path.

Figure 3:
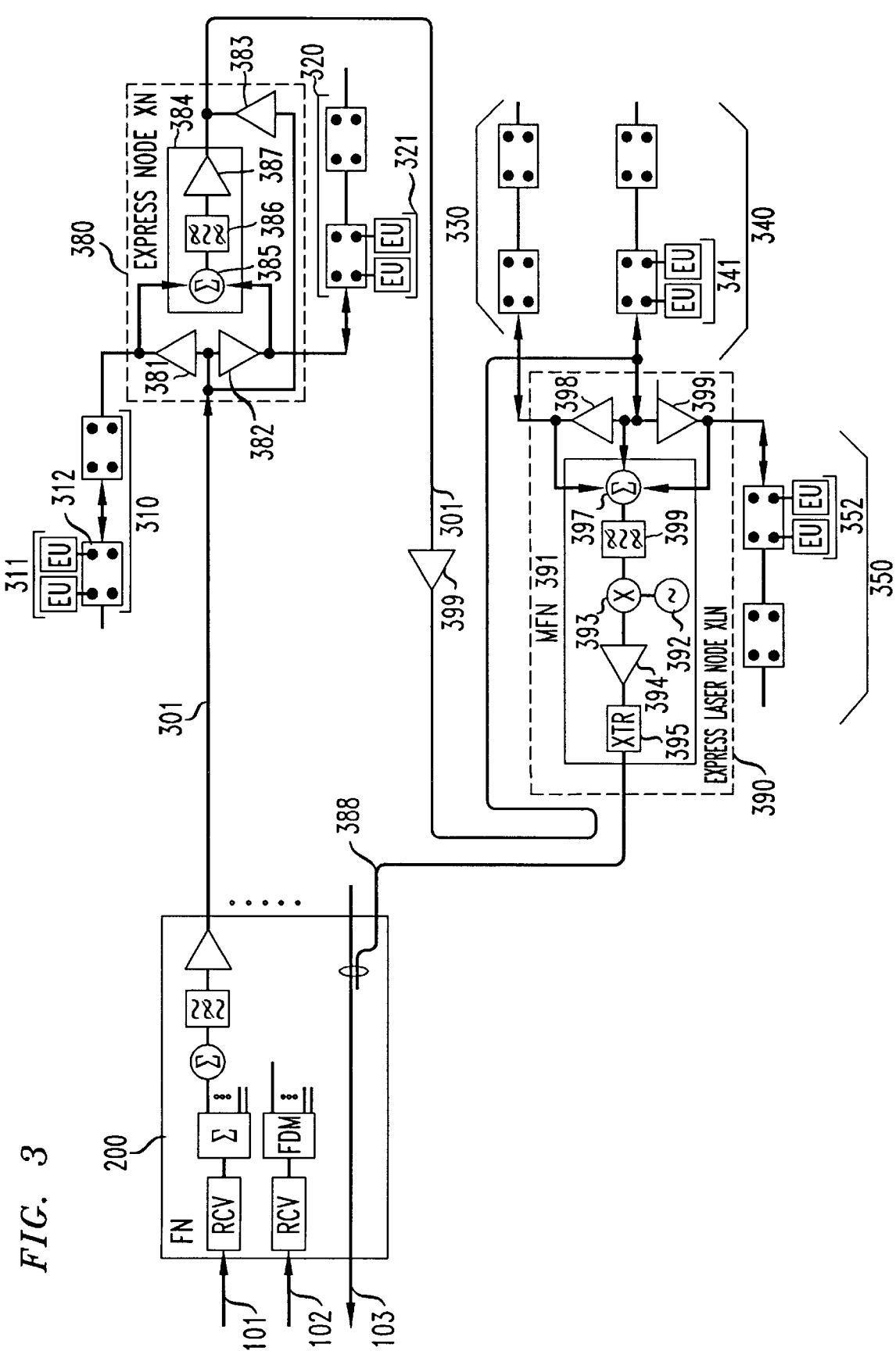
FIG. 3 shows a second illustrative embodiment of a two-way broadband network utilizing express laser nodes in accordance with the previously referenced patent application.

With reference to FIG. 3, we describe another embodiment of the previously referenced patent application utilizing an express node XN 380 on each primary coax branch 301 and an express laser node XLN 390 at the end of each primary coax branch 301. The XN node 380 enables end units 311, 321 connected to passive tapped distribution branches 310, 320 to transmit return signals downstream over the express feeder cable 301, and amplifier 389, to the MFN 391 in express laser node XLN 390. There may be multiple XNs 380 serving multiple sets of tapped distribution branches along each primary branch 301. However, all return signal transmissions from end units (e.g., 311) are effectively transmitted upstream over their respective tapped coax branch (i.e., 310) to the express node XN 380. Hence, bi-directional services over such a coax branch (a bi-directional access path), e.g., 310, can be mixed within a common block of bandwidth (i.e., B5 of FIG. 2).

To avoid collision at the express node XN 380 or express laser node XLN 390, each unit on each coax branch (i.e., 310, 320, 330, 340 and 350) needs to obey some medium access protocol. This may require, for example, that each unit transmit on a different portion of an "upstream" band than all other end units. This would be frequency-division multiple access (FDMA). Alternatively, each unit could be assigned a fixed or variable time slot within one frequency channel, using one of numerous well-known time-division multiple access (TDMA) protocols. Code-division multiple access (CDMA), or combinations of any medium access protocols that allow multiple units to share a common bandwidth, could be used. The term frequency-division multiplexing (FDM), referred to herein, includes any combination of FDMA, TDMA or CDMA within a plurality of predefined frequency channels of the FDM system. More specifically, a preferred embodiment would subdivide the return signal bandwidth B2*b* into N channels, each with some predefined information capacity. A TDMA protocol, negotiated between each end unit and a CO controller, would assign several end units to time slots within each channel, and prevent or resolve collisions in return transmission within each channel. End units (e.g., 311) may or may not share the same return channel as the other end units connected to the same tapped distribution cable 310.

The filter 386 is used to limit the bandwidth of the return signals to the intended band B2*b*. It could also be used to subdivide bandwidth B2*b* into separate channels such that, for example, all end units 311, 321 on branches 310, 320 use a different return portion of B2*b* than do the end units 341, 352 on branches 340 and 350. If these filters 386, 396 are programmable, along with filter 203 (FIG. 2), then these allocations can be changed dynamically. Also, the total bandwidth B2*b* used by all end units can be increased by changing or reprogramming these filters, allowing return bandwidth to be traded for downstream bandwidth to meet changing requirements. Alternatively, the total bandwidth B2*b* could be defined when the system is first installed, or upgraded.

Express node XN 380 includes amplifiers 381–383 and summer/filter circuit 384. In the express node XN 380, the circuit 384 consists of summer 385, bandpass filters 386 and amplifier 387 for selecting and sending the return signal downstream. In express node XN 380, if the bandpass filter 386 is programmable, then the return signal downstream bandwidth can be defined dynamically. Express amplifier 383 provides gain for the express or untapped feeder line or cable 301. Along coax cable 301, all of the active components (amplifiers, bridgers, etc.) are centralized to several express nodes (e.g., 380, 390) from which passive branches (e.g., 310) with drop taps (e.g., 312) are used as distribution branches.

Express laser node XLN 390 includes an MFN 391 and amplifiers 398 and 399. In XLN 390, the MFN 391 includes summer 397, bandpass filter 396, local oscillator 392, mixer 393 (or other suitable frequency translation means), amplifier 394 and laser transmitter 395.

Cost effective implementation of FIG. 3 is obtained by sharing photonic components (e.g., 395) among as many end units as possible, and also by minimizing the number of coax amplifiers (e.g., 381) utilized by the network. Based on this architecture, the express node XN 380 collects all the return signal information from all end units (e.g., 311) it services over the passive distribution coax branches (e.g., 310) and sends it to the express laser node XLN 390 following the same downstream path over express feed line 301. The XLN 390 combines all the return signal information from all end units (e.g., 341, 352) it services together with all the return signal information from all end units (e.g., 311, 321) served by other XNs (XN 380 in our example) and combines the return signals and sends it as upstream information over optical fiber 388. At FN 200 the upstream information or signal is coupled to the return fiber trunk 103. Therefore, a fiber/coax ring (using coaxial cable 301 and optical fiber 388) is realized using one or more express nodes (e.g., 380) distributed along the express feeder line (e.g., cable 301) and one express laser node XLN 390.

Due to the wide variety of existing coax network structures and geographies, it may not be possible to centralize all active components at XNs along one primary express feeder line 301. In such a case (not shown), it is desirable to deploy a sub-express line which connects to the primary express feeder line. This sub-express line may interconnect one or more XNs and an additional XLN. The above-described strategy may be used for each sub-express line as for each primary express line.

Figure 4:
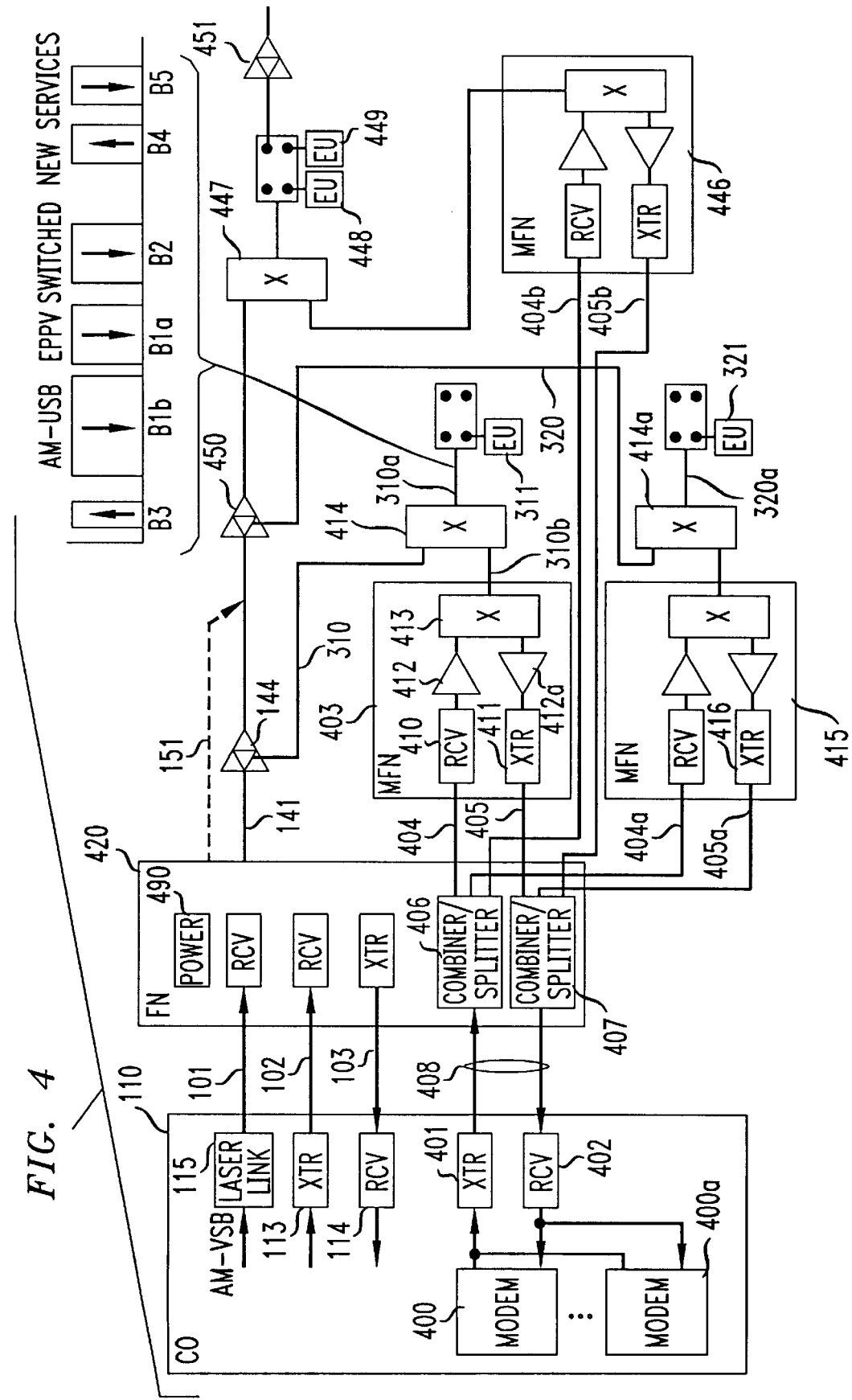
FIG. 4 shows an illustrative embodiment of a two-way broadband network in accordance with the present invention.

FIG. 4 shows our uni-directional or bi-directional communication system, similar to FIG. 1, in which the CO 110 delivers a broadcast signal from laser link 115 over communication path 101 and switched signal path 102 to FN 420 (also referred to as a distribution unit). FN 420 then combines the signals (in the manner of FN 120) and delivers the combined signal to end unit 311 over coax cables 141, 310 and 310*a*. End unit 311 can also receive signals from MFN 403 via diplexer 414 In a similar manner, MFN 415 provides access via diplexer 414*a* to end unit 321. End unit 321 connects to coax cable 141 via amplifier 450 and access paths 320 and 320*a*. The coax amplifiers 144 and 450 have a bandwidth up to band B2 which is typically 350, 550 or 750 MHz, while the coax cables 141, 310 and 310*a* could have bandwidth larger than that of amplifier 144, up to 1 GHz.

With reference to FIG. 4, the present invention connects MFN 403 to bi-directional or uni-directional amplifier 144 (also referred to herein as a node apparatus) via path 310. The MFN 403 (also referred to herein as a converter apparatus) consists of optical receiver 410, laser 411, amplifiers 412 and 412*a*, and diplexer 413. Additional fibers 404 and 405 connect MFN 403 back through combiner/splitter 406 and 407, respectively, to transmitter 401 and receiver 402 at the CO 110. Similarly fiber 404*a* and 405*a* connect MFN 415 and fibers 404*b* and 405*b* connect MFN 446 to combiner/splitters 406 and 407. It should be noted that MFN 403 and MFN 415 can be connected together via the same fibers, e.g., 404 and 405, by extending the fibers between MFN 403 and MFN 415. In such an arrangement, combiner/splitters 406 and 407 are located at MFN 403. Thus, if geographically or economically practical, one fiber path 404 and 405 may be used to interconnect all MFNs to the FN 420. The transmitter 401 and receiver 402 use modems 400–400*a* to provide access to switch services at CO 110.

With this arrangement, the existing distribution system, FIG. 1, could still operate in the same way, delivering services using the B3, B1 and B2 frequency band over coax cable 141, access path 310 to 310*a* to end unit 311. The transmitter 401 and receiver 402 then deliver new services in frequency bands B4 and B5 over fibers 404, 405 to MFN 403 which further transmits them to end unit 311 over access path 310*a*. The system bandwidth is therefore increased above the bandwidth limitation of coax amplifier 144 for both upstream and downstream transmission.

This strategy also allows the existing switched service in frequency bands B3 and B2, and even EPPV B1*a*, to be transmitted over fibers 404 and 405. The new services transmitted over fibers 404 and 405 could also utilize frequency band B3, B1*a* and B2.

The diplexer 413 is used to separate frequency bands B4 and B5. The diplexer 414 is used to insert signals from MFN 403 into access path 310 and separate existing frequency bands B3, B1 and B2 from and to amplifier 144 from new bands B4 and B5 served by MFN 403. The diplexer 414 separation range could be dynamically arranged such that the services delivered to end unit 311 over the existing cable 141 system and services delivered over new fibers 404 and 405 could also be dynamically allocated.

It is understood that uni-directional, rather than bi-directional, services could be provided. If only enhanced downstream services are required, then fiber 405, laser 411, amplifier 412a, diplexer 413, combiner/splitter 407, receiver 402 and modem 400a could be omitted. If only upstream services are desired, then fiber 404, receiver 410, amplifier 412 and diplexer 413 could be omitted, as well combiner/splitter 406, laser 401 and modem 400. These modifications can be made to any MFN requiring only uni-directional services.

According to another feature of the present invention, a MFN 446 can also be connected to coax cable 141 to provide access to end unit 448. As shown, a diplexer 447 is used to connect MFN 446 to coax cable 141 and fibers 404b and 405b are used to connect MFN 446 to combiner/splitters 406 and 407. Additionally, it should be noted that amplifier 450 could optionally be connected to FN 420 over its own coax cable 151. Electrical power located at FN 420 can be provided to all of the MFNs via the coax cables 141, 151. Also, one MFN could connect to more than one access paths which are associated with the same or different coaxial amplifiers. The MFN could also connect to more than one primary path or the combination of a primary and access path.

Optical paths 404 and 405 could use the same optical fiber. WDM or FDM techniques could be used to reduce crosstalk between the upstream and downstream signals. As another feature of the present invention, each MFN, e.g., 403, 415 and 446, could communicate with the central office at different optical wavelengths. The combiner/splitters 406 and 407 could then be replaced by a WDM combiner/splitter.

The upstream 405 and downstream 404 fiber paths may use a combination of TDMA/TDM within a FDM channel. Therefore the end units 311 and 321 could share the same frequency channel and same modem 400 at CO 110 even though they are served by two different MFNs, 403 and 415.

It should be noted that modem 400–400a can each operate at different frequencies. Moreover, each modem 400–400a can be shared by different MFNs 403, 415 and 446 so that the same frequencies can be used by different end units 311, 321 and 448 connected to these respective MFNs. Additionally, the fiber, e.g., 404 and 405, can also be connected directly to CO 110, so that combiner/splitters 406 and 407 are eliminated.

Moreover, the MFNs 403, 415 and 446 may be utilized to convert the format and frequencies of signals communicated between end unit and fibers 404–404b, 405–405b. Additionally, any or each of the MFNs may be used to provide a local area network (LAN) whereby upstream signals received from an end unit may be routed downstream to other end units over the same or different access paths connected to a MFN. Thus, for example, end unit 448 can communicate with end unit 449. It should also be noted that CO 110 can send downstream pilot signals, illustratively, to MFN 403 over the paths 408, 404 which MFN 403 then returns as a response signal with information encoded therein. This is used to enable CO 110 to provide a network monitoring function. For a tapped-bus architecture, the MFN is connected to the primary path 141 after coax amplifier 450.

Figure 5:
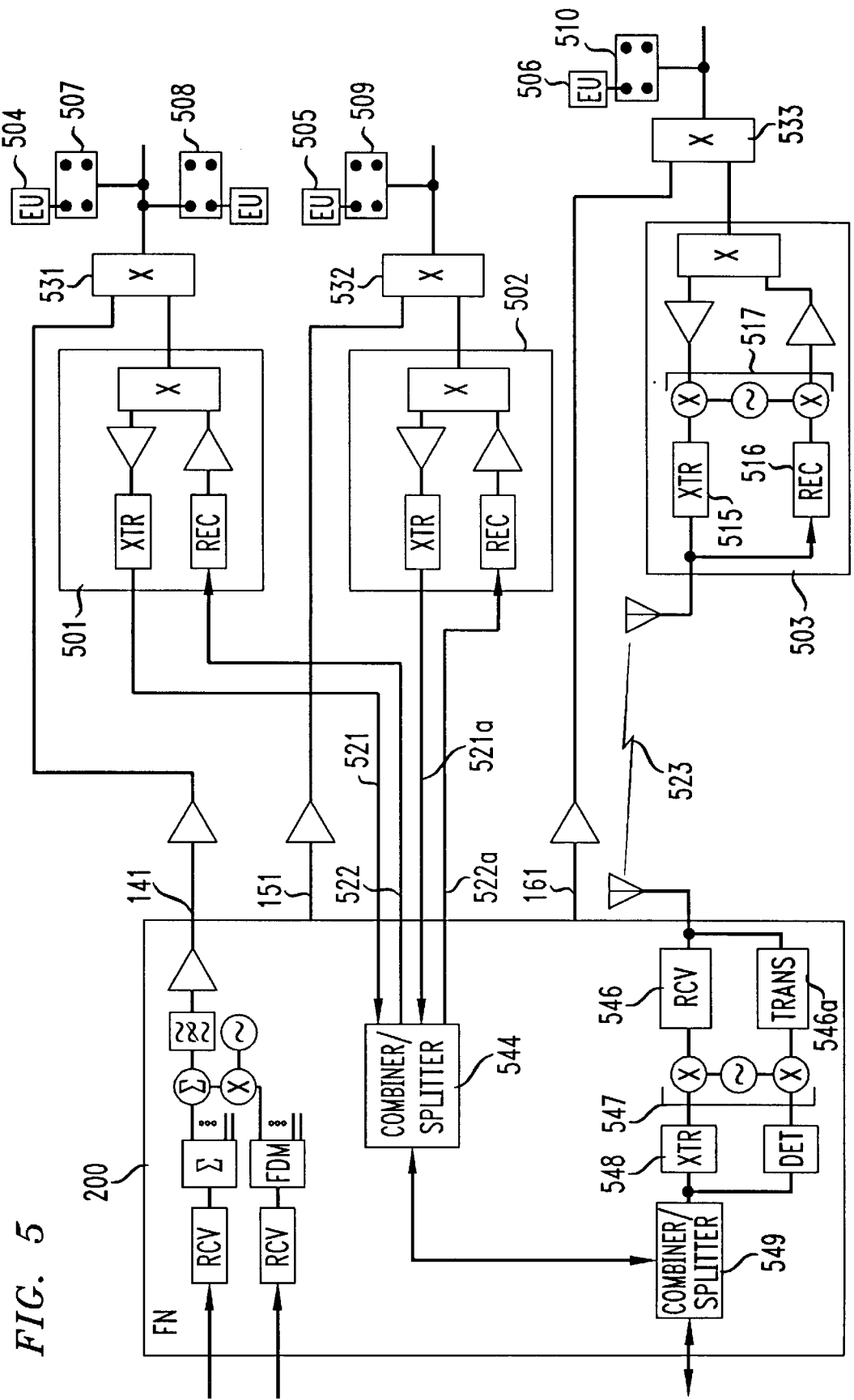
FIG. 5 shows another illustrative embodiment of a two-way broadband network in accordance with the present invention.

Shown in FIG. 5 is an embodiment of the present invention where fiber node (FN) 520 serves multiple coaxial cable networks 141, 151 and 161, each communicating to different sets of end units and each having its own MFN 501 and 502 or, alternatively, a mini-radio node (MRN) 503. Cable taps 507–510 provide end units 504–506 access to respective cable networks 141, 151, and 161 and MFNs 501 and 502 and MRN 503. The MRN 503 uses radio transmission 523 to receiver 546, rather than optical transmission. In such an arrangement, a passive optical combiner or coupler 544 may be used to combine the return optical signals from optical fibers 521 and 521a for upstream transmission via combiner 549 to the CO (110 of FIG. 2). The combiner 544 obviously can be located separately or co-located with MFN 501, 502 or at FN 520 (as shown). Each MFN could also translate the frequency of its selected upstream channel to the frequency needed for subcarrier multiplexed transmission over its respective optical fiber (521, 521a). Alternatively, a radio path 523, established between radio transmitter/receiver 515/516 at FN and transmitter/receiver 515/516 at MRN, may be used for upstream/downstream communications. Radio signals transmitted from MRN 503 to FN 200 can be received at receiver 546 and frequency-shifted (547) and transmitted optically using laser 548 back to the CO 110 (FIG. 2). These upstream signals are combined with other return optical signals from combiner/splitter 544 using combiner/splitter 549. Downstream signals received at combiner/splitter 549 are sent to combiner/splitter 544 for transmission over fibers 522 and 522a to MFNs 501 and 502, respectively.

What has been described is merely illustrative of the application of the principles of the present invention. Other arrangements and methods can be implemented by those skilled in the art without departing from the spirit and scope of the present invention.

Figure 6:
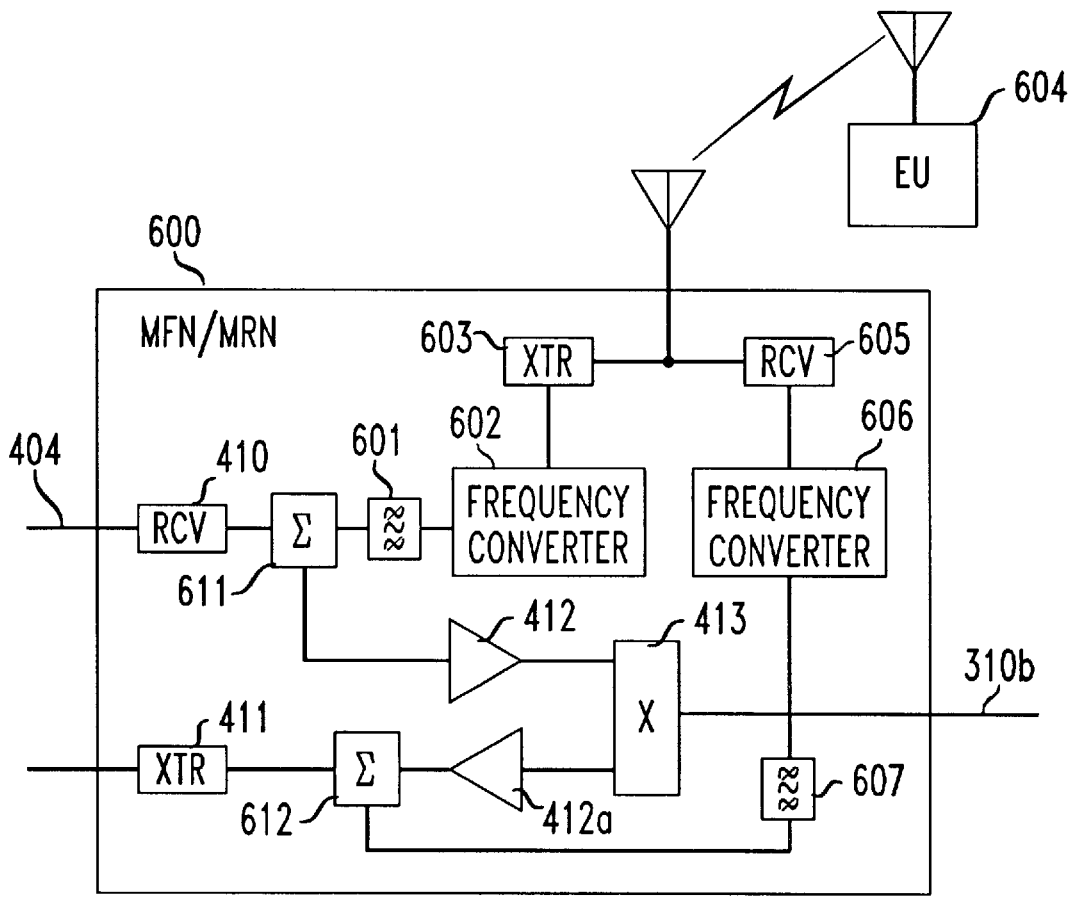
FIG. 6 shows a block diagram of another embodiment of an MFN node in accordance with the present invention.

The MFNs could also include radio ports (RPs) for providing Personal Communication Services (PCS) or wireless services, since the invention increases the upstream (return) and downstream signal bandwidth of the coax system. With reference to FIG. 6, in such an arrangement, the signals to be broadcast over the air in the vicinity of MFN/MRN 600 would be transmitted downstream over the fiber 404 (alternatively, it could be delivered over the coax 141 as shown in FIG. 4) within a portion of spectrum B2 or B5 (FIG. 4). The appropriate RF broadcast signal would be selected using filter 601 and converted to an appropriate air frequency using frequency converter 602; then transmitted by XTR 603 to multiple fixed or mobile end units 604. Return transmissions from 604 are received by receiver 605 and converted by frequency converter 606 to the desired frequency or format filtered by 601 and transmitted by laser 411 over fiber 405. The over-the-air signal could also be directly transmitted between MFN/MRN 600 and the central office or FN without any frequency or format conversion. This wireless capability can be supported simultaneously with the previously described wired services provided to end unit 311 over coax branch 310a using the previously described amplifiers 412 and 412a.

In addition, various well-known forms of multiplexing can be used in place of the optical combiner (e.g., 406 and 407 of FIG. 4) to combine and split the upstream and downstream signals transmitted over fibers 404a–404b and 405a–405b. For example, different optical wavelengths could be transmitted from the laser transmitter at each MFN (e.g., 411 and 416 of FIG. 4) and a wave-division multiplexer (WDM) combiner could be used to combine the wavelengths at the FN (or other location), e.g., combiner 407, for transmission back to the CO. Alternatively, the FDM signals sent to/from each MFN or MRN could have their RF format changed in order to improve robustness or spectral efficiency. The latter would be appropriate whether or not techniques were used to obtain baseband digital return signals at each MFN.

If we want to be able to dynamically control, or allocate, upstream and downstream bandwidth used by each MFN, then some portion of downstream spectrum can be used to provide control information with which to set the status or frequency of diplex filters associated with each MFN (i.e., 413, 414).

Although the description thus far has focused on a coaxial cable distribution system (e.g., 141 of FIG. 4), the techniques would also apply to an optical distribution system. In this case, for example, the coaxial cable 141 would be replaced by an optical fiber; drop taps would be replaced with the appropriate optical couplers; and amplifier 144 would be replaced with optical amplifiers. All these components are well known in the prior art. This fiber distribution network would be served by lasers, rather than by amplifier 129. Upstream and downstream transmission could be separated using an optical splitter or wavelength multiplexer, in place of diplexer 128. In place of the frequency-division multiplexing that was used to combine multiple channels over the coax, as shown by 141a, optical frequency-division multiplexing (also referred to as wavelength-division multiplexing) would be used. The parallel between electrical and optical frequency-division multiplexing is well known. Hence, the techniques disclosed herein would also solve anticipated limitations in achieving suitable return bandwidth in optical access systems. It should also be noted that fibers 404, 405 and 408 may be implemented using a single fiber using well-known wavelength-division multiplexing (WDM) or subcarrier FDM, or time-division multiplexing (TDM).

It should be noted that the previously described communication paths (e.g., first, second, primary and access communication paths) could be formed from one or more path segments selected from a group including coaxial cable, optical fiber, one or more wire pairs, or a radio communication path.

We claim:

1. A communication network comprising a central office (CO) for transmitting frequency-division multiplexed (FDM) signals downstream to at least one distribution unit over a communication path, said distribution unit including means for transmitting the FDM signals downstream to a plurality of end unit apparatuses over a signal distribution system that includes at least one primary path, a node apparatus connected to a first section of the primary path and at least one access path connected to the node apparatus, said node apparatus including means for passing the FDM signals further downstream over a second section of the primary path and for distributing at least a portion of the downstream signals over the access path to at least one end unit apparatus, said network further comprising converter apparatus connected to at least one access path and including communication means for providing at least unidirectional communication signals selected from a group including downstream second FDM signals received directly from the central office over a second communication path and sent to the at least one end unit apparatus over the access path, and upstream FDM signals received from the at least one end unit apparatus over the access path and sent to the CO over the second path.

2. A communication network comprising a central office (CO) for transmitting frequency-division multiplexed (FDM) signals downstream to at least one distribution unit over a communication path, said distribution unit including means for transmitting the FDM signals downstream to a plurality of end unit apparatuses over a signal distribution system that includes at least one primary path, a node apparatus connected to a first section of the primary path and said node apparatus including means for passing the FDM signals further downstream over a second section of the primary path to at least one end unit apparatus, said network further comprising converter apparatus connected to at least one second section of the primary path and including communication means for providing at least unidirectional communication signals selected from a group including downstream second FDM signals received directly from the central office over a second communication path and sent to the at least one end unit apparatus over the second section of the primary path, and upstream FDM signals received upstream from the at least one end unit apparatus over the second section of the primary path and sent to the CO over the second path.

3. The network of claim 1 or 2 wherein the node apparatus includes means for coupling upstream FDM signals from either the primary path or the access path or from both paths and for communicating them over the primary path to the distribution unit.

4. The network of claim 1 or 2 wherein said node apparatus has smaller or the same frequency bandwidth as that of the primary and access paths and wherein said FDM signals communicated by the converter apparatus are in the frequency band outside the bandwidth of said node apparatus.

5. The network of claim 1 or 2 wherein said FDM signals communicated by the converter apparatus are within the bandwidth of said node apparatus.

6. The network of claim 1 or 2 wherein the end unit apparatuses associated with the same or different converters could share the same frequency channel being received or transmitted by the same or different modems at the CO using time division multiplexing or by using a different dedicated frequency channel for each end unit apparatus.

7. The network of claim 1 or 2 including a second converter apparatus connected with a second node apparatus over the same or different primary path than the first node apparatus and wherein each converter apparatus communicates with at least one end unit apparatus and each converter apparatus uses a different second communication path, and combiner/splitter means for combining/splitting said FDM signals from said second communication paths.

8. The network of claim 1 or 2 wherein the CO transmits the FDM signals to end unit apparatuses over the communication path and primary path and wherein the CO is also arranged to transmit at least a portion of the FDM signals to the converter apparatus over the second path, whereupon the converter then transmits said communication signals to at least one end unit.

9. The network of claim 1 or 2 wherein at least one end unit apparatus transmits upstream signals to the CO over the primary path and communication path and wherein the converter is also arranged to select and to transmit at least a portion of the said upstream signals to the CO over the second path.

10. The network of claim 1 wherein
at least one converter apparatus associated with a node apparatus dynamically partitions the total bandwidth of at least one access path connected thereto into a first bandwidth for signals transmitted between the node apparatus and the end unit apparatus and a second bandwidth for signals carried by the converter and second path without affecting the transmission over other access paths associated with the same or different node apparatuses and the transmission over the primary path.

11. The network of claim 2 wherein
at least one converter apparatus associated with a node apparatus dynamically partitions the total bandwidth of at least one second section of the primary path connected thereto into a first bandwidth for signals transmitted between the node apparatus and the end unit apparatus and a second bandwidth for signals carried by the converter and second path without affecting the transmission over other second sections of the primary path associated with the same or different node apparatuses and the transmission over the first section of the primary path.

12. The network of claim 1 or 2 wherein
said converter apparatus converts the format and frequency of signals communicated between at least one end unit apparatus and the second path.

13. The network of claim 1 or 2 wherein the CO sends downstream pilot signals to the converter apparatus over the second path, which then returns responding signals to the CO for network monitoring.

14. The network of claim 1 or 2 wherein said converter apparatus routes upstream signals received from at least one end unit apparatus downstream to at least one other end unit apparatus which connects to the same node apparatus.

15. The network of claim 1 or 2 further including
a power node co-located with the distribution unit, said power node distributing electrical power to at least one node apparatus and at least one converter apparatus over the primary path.

16. The network of claim 1 or 2 wherein the converter apparatus includes
wireless means for transmitting downstream signals from the second path to another one or more end unit apparatus and
wireless means for receiving upstream signals from said another one or more end units and transmitting those upstream signals back to the CO over the second path and wherein
said another one or more end unit apparatus includes
wireless means for receiving downstream signals from the converter apparatus and
wireless means for transmitting upstream signals to said converter apparatus.

17. The network of claim 1 or 2 wherein
the communication, primary and access paths are formed from one or more path segments selected from a group including coaxial cable, optical fiber, and one or more twisted wire pairs, and the second path is a radio link;
said converter apparatus includes means for communicating radio signals with said distribution unit or the CO; and wherein the converter apparatus further converts radio signals to a format and frequency that is suitable for communication over the access and primary path with at least one end unit apparatus.

18. The network of claim 1 or 2 wherein
the communication, primary and access paths are formed from one or more path segments selected from a group including coaxial cable, optical fiber, and one or more twisted wire pairs, and the second path is formed from one or more path segments selected from a group including optical fiber, radio link, coaxial cable, and one or more twisted wire pairs.

19. The network of claim 1 or 2 wherein
each of at least two converter apparatuses is connected with a different node apparatus and communicates over different second paths using different optical wavelengths and the network further includes
wavelength-division multiplexing (WDM) combiner means for combining multi-wavelength upstream signals from said second paths, and
WDM splitter means for splitting multi-wavelength downstream signals to said second paths.

20. The network of claim 1 or 2 wherein said converter apparatus communicates upstream and downstream signals at different optical wavelengths or different subcarrier RF frequencies over the second path formed by a single optical fiber.

21. A converter apparatus comprising:
means for receiving downstream FDM signals over a communication path and distributing the downstream FDM signals over an access path to one or more end unit apparatuses,
means for receiving downstream second FDM signals directly from the central office (CO) over a second communication path and for sending the second FDM signals to the at least one end unit apparatus over the access path, and
means for receiving upstream FDM signals from the at least one end unit apparatus over the access path and for transmitting the upstream FDM signals to the CO over the second path.

22. A method of operating a communication network including a central office (CO) for transmitting frequency-division multiplexed (FDM) signals downstream to at least one distribution unit over a communication path, said method comprising the steps of:
at said distribution unit, transmitting the FDM signals downstream to a plurality of end unit apparatuses over a signal distribution system that includes at least one primary path, a node apparatus connected to a first section of the primary path and at least one access path connected to the node apparatus;
at said node apparatus, passing the FDM signals further downstream over a second section of the primary path and distributing at least a portion of the downstream signals over the access path to at least one end unit apparatus;
at a converter apparatus connected to at least one access path, providing at least unidirectional communication signals selected from a group including
downstream second FDM signals received directly from the central office over a second communication path and sent to the at least one end unit apparatus over the access path, and
upstream FDM signals received from the at least one end unit apparatus over the access path and sent to the central office over the second path.

23. A method of operating a communication network including a central office (CO) for transmitting frequency-division multiplexed (FDM) signals downstream to at least one distribution unit over a communication path, said method comprising the steps of:
- at said distribution unit, transmitting the FDM signals downstream to a plurality of end unit apparatuses over a signal distribution system that includes at least one primary path and a node apparatus connected to a first section of the primary path;
- at said node apparatus, passing the FDM signals further downstream over a second section of the primary path to at least one end unit apparatus; and
- at a converter apparatus connected to at least one second section of the primary path, providing at least uni-directional communication signals selected from a group including
- downstream second FDM signals received directly from the central office over a second communication path and sent to the at least one end unit apparatus over the second section of the primary path, and
- upstream FDM signals received upstream from the at least one end unit apparatus over the second section of the primary path and sent to the central office over the second path.

24. The method of claim 22 or 23 wherein the node apparatus includes the steps of
- combining FDM signals of the primary path with FDM signals of the access path and communicating them over the primary path to the distribution unit.

* * * * *